No. 849,882. PATENTED APR. 9, 1907.
E. BARTLEY.
TRUCK.
APPLICATION FILED MAY 24, 1906.

WITNESSES: M. A. Schmidt, Geo. E. Tew.

INVENTOR Edward Bartley,
BY Milo B. Stevens & Co.
Attorneys

UNITED STATES PATENT OFFICE.

EDWARD BARTLEY, OF CHICAGO, ILLINOIS.

TRUCK.

No. 849,882.   Specification of Letters Patent.   Patented April 9, 1907.

Application filed May 24, 1906. Serial No. 318,584.

*To all whom it may concern:*

Be it known that I, EDWARD BARTLEY, a citizen of the United States, residing at Chicago, in the county of Cook and State of Illinois, have invented new and useful Improvements in Trucks, of which the following is a specification.

This invention is a truck or sled particularly adapted for hauling purposes, although suitable for amusement by sliding thereon down an inclined plane.

The principal features of the invention are two runners or elliptical frames having endless belts or bands on their rims or peripheries, means for oiling the contacting surfaces, and means for retaining the belts on the runners.

Figure 1:
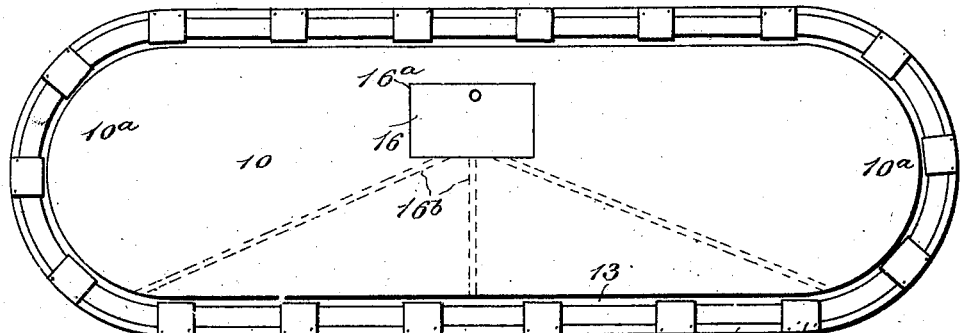
Figure 2:
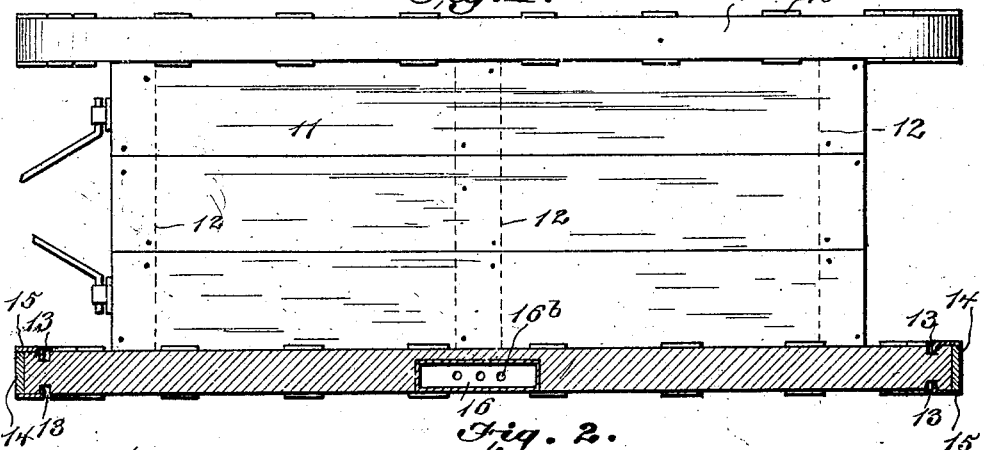
Figure 3:
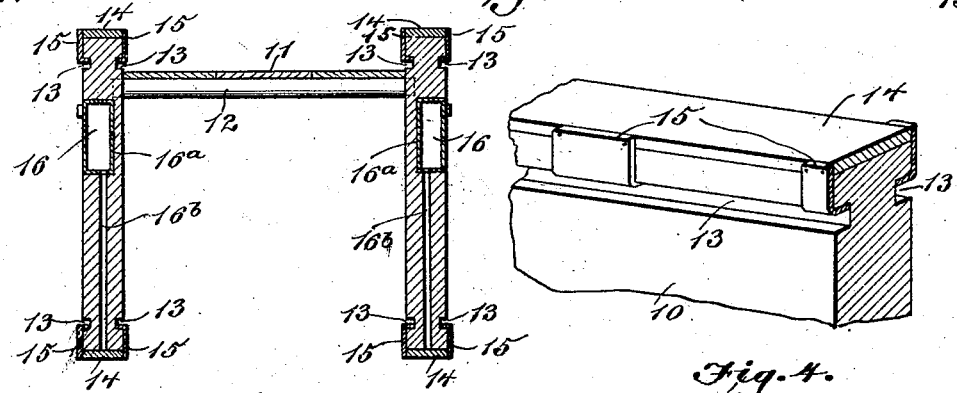
Figure 4:
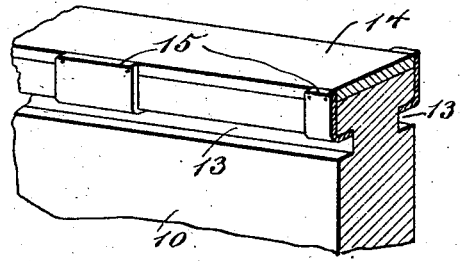

In the accompanying drawings, Figure 1 is a side view of the truck. Fig. 2 is a plan view with one runner in horizontal section. Fig. 3 is a central vertical cross-section, and Fig. 4 is a sectional detail.

In the drawings, 10 refers to the runners of the truck, between which is a platform 11 on suitable cross-supports 12, gained into the runners. Each runner has parallel upper and lower edges and semicircular ends, as at 10ª, and has a slot 13 on both sides extending parallel to and near the rim or edges of the runner. Fitting around the rim of each runner is an endless belt 14, preferably of leather, and the belt is held on the runner by inwardly-projecting metal clips 15, attached at suitable distances apart to the opposite edges of the belt 14. These clips have hooked or inturned ends which engage in the slots 13.

To lubricate the contacting surfaces of the runners and rims, oil cups or receptacles 16 are placed respectively in a recess 16ª in each runner, and 16ᵇ are a series of tubes or ducts extending from the cups downwardly through the runners to the lower run of the belt for supplying oil to the belt at the base of the runner at several points. This keeps the belt flexible and prevents same from wearing and also decreases friction.

This truck is desirable and useful for hauling purposes, such as transporting stones, barrels, &c., and may be used for general purposes. It may be drawn by a suitable tongue or by a chain.

I claim—

1. A truck comprising runners having grooves in the sides thereof parallel to the rim, a platform supported on the runners, and belts of flexible material fitting the rims of the runners and slidable around the same and having clips engaging in said grooves.

2. A truck comprising runners, a platform supported thereon, belts extending around the rims of the runners and slidable thereon, and oil-cups carried by the runners and having ducts leading to the inner surface of the belts.

In testimony whereof I have signed my name to this specification in the presence of two subscribing witnesses.

EDWARD BARTLEY.

Witnesses:
SIGNA FELTSKOG,
H. G. BATCHELOR.